United States Patent Office 3,505,045
Patented Apr. 7, 1970

3,505,045
ABRASIVE BACKINGS SATURATED WITH CO-
POLYMERS OF ACRYLIC ESTER AND NI-
TRILE MONOMERS
William A. Klein, St. Paul, Minn., assignor to Minnesota
Mining and Manufacturing Company, St. Paul, Minn.,
a corporation of Delaware
No Drawing. Continuation-in part of application Ser. No.
296,482, July 22, 1963. This application Mar. 19, 1968,
Ser. No. 714,324
Int. Cl. B24d *11/02, 3/00;* C09k *3/14*
U.S. Cl. 51—295    15 Claims

ABSTRACT OF THE DISCLOSURE

Superior heat stability, solvent- and water-resistance, and abrading performance are imparted to coated abrasive material having a fibrous backing by saturating the backing with a copolymer formed by reacting certain acrylic ester, nitrile, and optionally acrylic acid, monomers in specified ratios.

---

This application is a continuation-in-part of copending application Ser. No. 296,482, filed July 22, 1963 and now abandoned.

This invention relates to coated abrasive products having a saturated fibrous sheet backing. A general object of this invention is to simplify and decrease the cost of coated abrasive manufacture by reducing the number of backings and treatments which are required for the various product lines. One specific object is to provide an abrasive product in which an animal hide glue "make" coat is directly and firmly adhered to an essentially temperature- and humidity-insensitive saturated fibrous backing.

Heavy duty coated abrasive belts for dry sanding operations are traditionally made on a drills or jeans cloth backing which is filled with a combination of hide glue, starch, and clay. This backing is satisfactory for many purposes, but its flaws are also well known. For example, repeated flexing changes the degree of stiffness which the backing possesses. As the relative humidity increases, the temperature at which the glue softens and becomes plastic decreases; conventional backings thus tend to become soft, sticky, and stretchy during the summer months. Additionally, unless special treating procedures are employed, the adhesion of animal hide glue and other make adhesives to the backing is not especially high; as a result, belts often fail by premature separation of the adhesive and mineral from the backing.

Waterproof synthetic and/or natural polymers are commonly used to saturate cloth backings for coated abrasive belts employed in wet sanding operations. For over twenty years cloth saturated with ethyl cellulose has been one of the most popular backings for use with phenolic resin make adhesives, hide glue, however, exhibits very poor adhesion to ethyl cellulose-treated cloth. Actually, it has been generally supposed that hide glue will not adhere very well to any synthetic polymeric material which can be employed as a saturant, a belief to which further credence has been lent by the relatively poor adhesion between a hide glue make adhesive and a natural or synthetic elastomer- or rubber filled cloth or paper backing.

I have now found an extremely versatile family of copolymers which can be used as sizes or saturants for cloth, paper, or other fibrous sheet material commonly employed as a coated abrasive backing. Backings containing these treatments are resistant to water and oils which may be employed as lubricants or coolants during the sanding process, and they are resistant to aging and embrittlement by heat. Despite their water-resistance, preferred treated backings are, surprisingly, receptive to hide glue, which adheres more tenaciously than to conventional backings. In fact, these backings demonstrate unusually high affinity for practically every adhesive I have ever tried, whether water-based or in solution in an organic solvent.

In preparing the novel coated abrasive structures of my invention, I employ a fibrous backing which is treated with a unifying, flexible, film-forming copolymer of monomers which comprise a polymerizable nitrile such as acrylonitrile, one or more alkyl acrylic esters, and preferably, a polymerizable alpha, beta-unsaturated acid having the methylene group attached to the alpha carbon atom. I select the ester monomer or monomers so that if polymerized per se to a molecular weight of about 40,000 the resultant polymer has a glass transition temperature of no more than 40° C. The glass transition temperature, Tg, which is closely associated with the brittle point, represents the temperature below which a film of the polymer cannot be bent without shattering. An article by Harry Burrell in the February, 1962, issue of "Official Digest" lists the glass transition temperatures for over one hundred polymers.

Although all esters of acrylic acid have a glass transition below 40° C., only n-propyl and higher alkyl esters of methacrylic acid are this low. It is possible to employ an ester monomer such as ethyl methacrylate, which, when polymerized, has a glass transition temperature of about 65° C., in combination with other acrylic ester monomers, provided that a copolymer formed solely from the ester components would have a glass transition temperature of below 40° C. The Tg for such an ester copolymer may be calculated by the following formula $$\frac{1}{Tg} = \frac{E_1}{Tg_1} + \frac{E_2}{Tg_2} + \ldots \frac{E_n}{Tg_n}$$

wherein Tg is the glass transition temperature of the copolymer; $E_1$, $E_2$, and $E_n$ represent weight fraction of monomers $E_1$, $E_2$, and $E_n$; and $Tg_1$, $Tg_2$, and $Tg_n$ are the respective absolute glass transition temperatures of homopolymers of the ester monomers.

Generally speaking, copolymers based on comparatively short chain ester monomers have better oil resistance and poorer water resistance than copolymers based on comparatively long chain ester monomers. I have found that copolymers based on n-butyl acrylate or methacrylate show satisfactory resistance to both oil and water and are extremely useful for my purposes. Copolymers based on ethyl acrylate have a somewhat higher heat-softening point and yield tensile strength, making them useful as saturants for backings for short belts used on platen sanders, where high heat may be developed.

In preparing the polymer saturant, or size, for the product of my invention I copolymerize about 30 to 80 parts by weight of nitrile with about 20 to 70 parts of acrylic ester monomer. Since a homopolymer of acrylonitrile is comparatively stiff (Tg=110° C.) it follows that those copolymers based on a high percentage of acrylonitrile monomer are also stiff; typically, however, such high-nitrile copolymers display improved heat stability, water resistance and solvent resistance, and have a tensile strength of the order of 6,000 p.s.i. at an ultimate elongation of up to 150%. Similarly, as the amount of acrylonitrile monomer in the copolymer is decreased, flexibility increases markedly; thus, a copolymer based on 25% acrylonitrile monomer may have a tensile strength on the order of 1,000 p.s.i. at an ultimate elongation of 350%.

Generally, too, the greater the percentage of ester monomer, the lower the solvent resistance of the ultimiate copolymer.

The preferred saturant for the practice of my invention also contains up to 15% by weight of polymerizable alpha, beta-unsaturated acid having a methylene group attached to the alpha-carbon atom. Such acids include acrylic, methacrylic, itaconic, alpha-alkylacrylic, alpha-aryl acrylic, alpha-choroacrylic, etc.; acrylic and methacrylic are particularly preferred. I find that the acid surprisingly tends to reduce the wet stretch of saturated backings and also seems to improve the adhesion of at least some coated abrasive make adhesives. Everything considered, a preferred saturant for a backing for use with any conventional coated abrasive make adhesive, is a copolymer formed from 35 to 70 parts by weight of acrylonitrile, 30–65 parts by weight of acrylic ester and 0–5 parts by weight of acid.

The copolymers which I employ are not novel per se, and may be prepared by emulsion polymerization in accordance with well-known procedures, e.g., as generally taught in U.S. Patents 2,753,318, 2,866,763 and others. A primary use taught by the prior art for the saturants which I employ is in them anufacture of waterproof materials; accordingly it has been particularly surprising to me to discover that water-based adhesives—e.g., phenol-formaldehyde, and particularly animal glue—can be successfully adhered to backings containing such saturants.

My invention will be better understood upon reference to the following illustrative but non-limitative examples, in which all parts are by weight unless otherwise specified.

EXAMPLE 1

This example relates to the preparation of cloth-backed coated abrasive belt stock having an animal glue make adhesive.

Method of manufacturing polymer

In a suitable polymerization container equipped with a stirrer, reflux condenser with inlet and outlet tubes, a thermocouple and heating and cooling apparatus, were placed 189 parts of water and 8.9 parts of dispersing agent ("Triton" X–200, a sodium salt of an alkyl aryl polyether sulfonate). Nitrogen gas was then bubbled through the solution to remove dissolved air and then continuously swept over the top of the reaction mixture in order to maintain an inert atmosphere in the reaction vessel. In o separate container 58.0 parts of n-butyl acrylate ($T_g = -52°$ C.) 37.0 parts of acrylonitrile, 5.0 parts of methacrylic acid, and 0.1 part of tertiary dodecyl mercaptan were blended. About 25% of the monomer blend was then charged to the polymerization container and the resulting emulsion warmed to 45–50° C., at which time an initiator consisting of 0.06 part of potassium persulfate and 0.03 part of sodium meta bisulfite was added.

The resulting exotherm from the heat of polymerization carried the temperature to 60.65° C. The remaining monomer solution was then added continuously at a rate which maintained the reaction temperature at 60–65° C., additional heat and initiator being provided near the end of the reaction to assure substantially complete polymerization of the monomers. Unreacted monomer was then removed by vacuum distillation. The pH of the copolymer latex reaction product was raised to 5.2 by adding 28% ammonium hydroxide to enhance mechanical stability. The final product contained 33.2% solids of a terpolymer having a calculated $T_g$ of $-4°$ C. Other procedures, well known in the art, may be used to conduct this polymerization.

General saturation procedure

Dyed and stretched jeans cloth weighing 12.5 lbs. per sandpapermaker's ream (480 9" x 11" sheets) was immersed in the copolymer latex described in the preceding section to thoroughly saturate the fibers. It was then passed between squeeze rolls, 5.8 lbs. of saturant solids per sandpapermaker's ream being retained in the cloth. The saturated backing was dried by passing it through a 180° F. hot air oven and over a series of heated rolls.

A 0.025-inch film cast from the latex saturant of this invention was found to be flexible, possessing a tensile strength at yield ($T_y$) of 1250 p.s.i. and an ultimate elongation ($E_b$) of 270% when tested at 73° F. and 48% relative humidity.

Preparation and testing of coated abrasive sheet material

The saturated and dried backing was then coated on the "square" side with a conventional hide glue make adhesive in an amount equivalent to 5.8 lbs./ream of glue solids. Grade 150 aluminum oxide mineral was then eletrostatically deposited in this adhesive layer in the amount of 11.3 lbs./ream. The glue was jelled to maintain the orientation of the mineral, after which a sandsize of base-catalyzed phenolic resin was applied in the amount of 5.8 lbs./ream of resin solids. The material was dried in festoons, wound into roll form, and placed in a 212° F. forced air oven for 12 hours to effect the final cure of the phenolic resin. The finished abrasive was then flexed in the conventional manner by passing it, abrasive side, in around a rubber roller while forcing a steel roller against the back side.

The adhesion between the glue make coat and the backing was measured by adhering the abrasive surface to a 2-inch wide strip of the coated abrasive just described to a pine board, doubling the strip back on itself at 180°, and measuring in a tensile test machine the force required to separate the glue from the backing at the rate of 2 inches per minute. The adhesion was found to be 15.5 lbs. per inch of width, whereas a control sample—identical except that it had a conventional starch-glue-clay treated jeans cloth backing—had an adhesion of only 10.5 lbs. per inch. (It might be noted that the adhesion of a glue make coat to an ethyl cellulose filled backing, of the type commonly used to make waterproof coated abrasive cloth, is substantially lower, and in fact can hardly be measured.) Omission of the methacrylic acid monomer from the reactants used to form the copolymer saturant reduces the make-backing adhesion value to 8.5, while raising the acid content up to 15% increases its value slightly.

The importance of make-backing adhesion was demonstrated by forming an endless belt 3" x 93" from the coated abrasive sheet material of this example, and mounting it on a conventional backstand sander, where it was trained over a 14-inch diameter smooth rubber contact wheel driven at 5500 s.f.p.m., the belt extending approximately ½ inch beyond one edge of the wheel. The face of a 2½" x 4" x ½" cold rolled steel bar was then urged against the edge of the wheel at 45° under a force of 6 lbs. The belt removed nearly 30% more steel before failure, then a control belt which was identical in construction except for the fact that the backing contained the conventional glue-starch-clay composition. This test has been found to correlate well with the industrial sanding of zinc die castings, where a belt is often made to conform to fillets, grooves, and internal curves.

It was additionally noted that the backing for the coated abrasive product of this Example retained substantially identical characteristics of stretch and flexibility at temperatures ranging between 10° F. and 100° F. and at relative humidities between 10% and 90%. In contrast, the conventional product became significantly more flexible and tacky at temperatures of 90° F., particularly when the relative humidity exceeded 50%.

EXAMPLE 2

This example describes the preparation of an improved waterproof paper-backed coated abrasive sheet.

A conventional 32-lb. saturating paper was saturated with a butadiene:acrylonitrile copolymer to bring the basis weight to 48 lbs. (4.1 lbs. per sandpaper-maker's ream). To the face side of the paper was then applied a 58:37:5 n-butyl acrylate:acrylonitrile:methacrylic acid copolymer latex (prepared as in Example 1), an air knife regulating the process so that 1.1 lbs. of solids per ream was applied, and the thus-sized paper dried for 1 hour at 195° F. To the back side of the paper was then applied a 54:43:3 n-butyl acrylate:acrylonitrile:methacrylic acid copolymer latex containing 20% diatomaceous silica (solids basis), the air knife limiting the amount applied to 0.7 lb. per ream, and the paper again dried for 1 hour at 195° F.

A control lot of paper, representing conventional prior art practice, was prepared in exactly the same way as in the preceding paragraph except that a modified polyvinyl chloride latex was used instead of the acrylate:acrylonitrile acid latices.

Both the experimental and the control backings were now coated with 1.8 lbs. per ream of a conventional oleoresinous varnish make coat, 5.4 lbs. of Grade 240 silicon carbide electrostatically applied, and the make coat cured 24 hours at 195° F. Each lot was thereafter sandsized with 3.7 lbs. of a conventional phenolic-modified alkyd resin and the sandsize cured 24 hours at 195° F.

The experimental coated abrasive abraded automative surfaces more rapidly and for a longer time than the control. The experimental material also showed greater make-backing adhesion, retained its original "body" longer in use, and possessed about 30% higher wet strength than the control lot.

If acrylonitrile:acrylate:acid latex replaces butadiene:acrylonitrile as the original saturant, coated abrasive products made on the backing display even greater water-resistance.

EXAMPLE 3

This example illustrates the preparation of a waterproof cloth-backed coated abrasive belt.

Desized, kierboiled, dyed, and stretched drills cloth was immersed in a 50:50 n-butyl acrylate:acrylonitrile copolymer dispersion prepared as in Example 1 and then passed between squeeze rolls, 5.7 lbs. of polymer solids per ream being retained by the cloth. (A film cast from this copolymer had a yield tensile strength of 4900 p.s.i. and an elongation at break of less than 50%.) The saturated cloth was then dried and subjected to a second saturation with the same copolymer, 2.5 lbs. of polymer solids per ream being retained. The twice-saturated backing was again dried and then subsized by immersing it in a 47% aqueous solution of a base-catalyzed phenol: formaldehyde resin and passed between squeeze rolls, 2.3 lbs. of resin solids per ream being retained. The cloth was then held in a 180° F. forced air oven for 80 minutes.

The backing was then coated on the "square" side with a conventional phenol-formaldehyde make adhesive in such quantity as to retain 5.4 lbs./ream of resin solids on the cloth. Grade 120 silicon carbide mineral was then electrostatically deposited in this adhesive layer in the amount of 15 lbs./ream. This coated cloth was passed through a forced air drying oven and a second layer of phenolic adhesive applied over the coated mineral in the amount of 4.8 lbs./ream of resin solids. After passing through a drying oven in festoons the material was then dried in festoons, wound into roll form and subjected to 212° F. in a forced air oven for 12 hours to effect the final cure of the adhesive layers. The finished coated abrasive was then flexed in the conventional manner. Stripback adhesion was 21.9 lbs. per inch of width, compared to 15 lbs. for a product which was identical except for being made on a conventional ethyl cellulose-saturated backing.

The product of this procedure may be used under dry sanding conditions but is especially designed to be used under wet sanding conditions. For such applications a low degree of wet stretch and flatness are essential to good performance. Wet stretch is measured by soaking a 1" x 6" sample in 70° F. water for 60 minutes and then measuring the elongation under a stress of 100 lbs. per inch of width. Wet stretch of the product of this example was 2.0%, compared to 2.0% for conventional material made on an ethyl cellulose-saturated backing. If, however, the copolymer saturant is formed from monomers which include at least 3% of an alpha-beta-unsaturated acid, the wet stretch value is substantially lowered, e.g., to 1.3%.

Wet flatness, or resistance to "cupping" is tested by immersing a 6" wide strip of coated abrasive, mineral side up, in 83° F. water. One end of the strip is held fixed, while a 30-lb. weight is suspended from the other end, which extends beyond the water trough; cupping is measured as the height of the chord drawn from one edge of the strip to the other, in 32ds of an inch. After 15 minutes the production of this example had a cupping value of less than 1, whereas a conventional product, made on an ethyl cellulose-saturated backing, had a cupping value of 20. Omission of the phenol:formaldehyde subsize from the product of this example results in a cupping value of about 9.

Tabulated below are representative copolymers which may be employed to saturate coated abrasive backings in accordance with my invention. Comments regarding the physical characteristics and general suitability of the polymers are also included.

| Copolymer | Acrylic Ester | Nitrile | Acid | Acrylate:nitrile:acid ratio | Ty, p.s.i. | Eb, percent | Tg of polymer formed from acrylate monomer, ° C. | Comments |
|---|---|---|---|---|---|---|---|---|
| A | Ethyl acrylate | Acrylonitrile |  | 54:46:0 | 6,900 | <25 | −22 | Stiff; good affinity for resins. |
| B | n-Butyl acrylate | do | Itaconic | 54:43:3 | 4,000 | 200 | −56 | Medium flexible; good affinity for resins. |
| C | do | do | Acrylic | 55:40:5 | 2,100 | 270 | −56 | Medium flexible; good affinity for animal glue, resins. |
| D | do | do | Methacrylic | 55:40:5 | 3,200 | 250 | −56 | Do. |
| E | do | do | do | 40:57:3 | 7,000 | 75 | −56 | Very firm; good affinity for resins. |
| F | do | do | do | 52:33:15 | 5,100 | 40 | −56 | Medium flexible; outstanding affinity for animal glue, resins. |
| G | do | do | do | 70:25:5 | Low | 550 | −56 | Very flexible; good affinity for animal glue, resins. |
| H | 2-ethyl hexyl acrylate | do | do | 62:35:3 | 700 | 400 | −70 | Flexible, good affinity for resins. |
| I | n-Butyl methacrylate | do | do | 55:40:5 | 4,100 | 140 | 22 | Medium flexible; good affinity for animal glue, resins. |
| J | Methyl acrylate | do | do | 55:40:5 | 9,500 | 25 | 9 | Very firm; good affinity for resin. |
| K | n-Propyl methacrylate | do | do | 55:40:5 | 3,750 | 10 | 35 | Do. |
| L | 1:1 ethyl acrylate:n-octyl acrylate | do | do | 54:43:3 | 3,600 | 250 | −51 | Flexible; good affinity for resins. |

| Copolymer | Acrylic Ester | Nitrile | Acid | Acrylate:nitrile:acid ratio | Ty, p.s.i. | Eb, percent | Tg of polymer formed from acrylate monomer, °C. | Comments |
|---|---|---|---|---|---|---|---|---|
| M | 1:1 methyl methacrylate:n-octyl acrylate. | do | Acrylic | 54:43:3 | 5,800 | 200 | 12 | Medium flexible; good affinity for resins. |
| N | 2-ethyl hexylacrylate | do | do | 35:60:5 | 3,300 | 25 | −70 | Firm, with tendency toward brittleness; good affinity for animal glue, resins. |
| O | n-Butyl acrylate | do | Methacrylic | 35:62:3 | 9,000 | | −56 | Firm, with tendency toward brittleness; good affinity for resins. |
| P | do | do | do | 30:67:3 | 9,900 | | −56 | Somewhat more brittle than O; excellent water- and solvent-resistance; superior stretch-resistance; good heat-resistance. |
| Q | do | do | do | 25–72:3 | 10,000 | | −56 | Firmer, more brittle than P; otherwise similar. |
| R | do | do | do | 15:82:3 | | | −56 | Too brittle for use where flexibility is paramount, but outstanding heat-, water- and solvent-resistance, affinity for resins. |

The foregoing examples are intended to illustrate several embodiments of my invention, but many other variations will readily occur to those skilled in the art. To illustrate, nitrile monomers other than those named may be employed in preparing saturant copolymers, provided that such monomers are capable of copolymerizing with the acrylate monomer. Similarly, just as two or more acrylate monomers may be employed, so also two or more nitrile monomers, or two or more acid monomers, may be used to formulate suitable saturant compositions.

The copolymers disclosed herein may also be used to saturate a wide variety of backings other than the conventional paper and cotton cloth. Such backings may include, for example, woven or nonwoven fabrics of nylon, polyethylene terephthalate, glass, polyethylene, and polypropylene. Similarly, "fibrid"-bonded natural or synthetic fiber paperlike sheets may be used.

Various modifiers may also be added to the polymer saturants described in this application. For example, a dibasic oxide such as zinc oxide may be added to those polymers which contain free carboxylic acid groups. The subsequent reaction between the zinc oxide and the acid groups establishes crosslinks between the various polymer chains, thus reducing the polymer's solubility and thermoplasticity. Various water soluble thermosetting resins such as those based on urea-formaldehyde, phenol-formaldehyde and melamine-formaldehyde may also be added to the latex as reinforcing agents.

What is claimed is:

1. Coated abrasive sheet material comprising in combination a layer of abrasive granules firmly bonded to a backing by a hardened binder adhesive, said backing comprising a fibrous sheet treated with a unifying flexible film-forming copolymer of monomers consisting essentially of 25 to 60 parts by weight acrylonitrile and 30 to 70 parts by weight of at least one acrylic ester formed by reacting an acrylic acid with an aliphatic monohydroxy alcohol having up to about 8 carbon atoms, the esters in said copolymer being selected such that if polymerized per se the resultant polymer will have a glass transition temperature lower than 40° C.

2. The product of claim 1 wherein said one acrylic ester is n-butyl acrylate.

3. The product of claim 1, wherein said fibrous sheet is woven cloth.

4. The product of claim 1, wherein said fibrous sheet is paper.

5. Coated abrasive sheet material comprising in combination a layer of abrasive granules firmly bonded to a backing of a hardened binder adhesive, said backing comprising a fibrous sheet treated with a unifying flexible film-forming copolymer of monomers consisting essentially of 25 to 60 parts by weight of acrylonitrile, from 0 to 15% by weight of polymerizable alpha, beta-unsaturated acid having the methylene group attached to the alpha carbon atom, and 40 to 65 parts by weight of at least one acrylic ester formed by reacting an acrylic acid selected from the class of acrylic acid and methacrylic acid with an alcohol having up to about 8 carbon atoms, the esters in said copolymer being selected such that if polymerized per se the resultant polymer will have a glass transition temperature lower than 40° C.

6. In a coated abrasive sheet structure in which a layer of abrasive grains is firmly bonded to a flexible saturated fibrous backing by a hardened binder adhesive selected from the class consisting of animal glue, phenol aldehyde resin and oleoresinous varnish, the improvement wherein the saturant consists essentially of the dried deposition product of an aqueous emulsion of a copolymer of monomers consisting essentially of 30 to 70 parts by weight of acrylic ester which if polymerized per se would have a glass transition temperature of less than 40° C., 30 to 60 parts by weight of acrylonitrile, and from 0 to 15% of polymerizable alpha, beta unsaturated acid having the methylene group attached to the alpha carbon atom.

7. In a coated abrasive sheet structure in which a layer of abrasive grains is firmly bonded to a flexible saturated fibrous backing by a hardened binder adhesive, the improvement wherein the saturant consists essentially of the dried deposition product of an aqueous emulsion of a copolymer of monomers consisting essentially of 40 to 65 parts by weight of an acrylic ester, 30 to 60 parts by weight of acrylonitrile and from 1 to 10% of a polymerizable alpha, beta-unsaturated acid having the methylene group attached to the alpha carbon atom.

8. The product of claim 7 wherein said acid is acrylic acid.

9. The product of claim 7 wherein said acid is methacrylic acid.

10. In a coated abrasive sheet structure in which a layer of abrasive grains is firmly bonded to a flexible saturated fibrous backing by a hardened binder adhesive, the improvement wherein the saturant consists essentially of the dried deposition product of an aqueous emulsion of a copolymer of monomers consisting essentially of 40 to 65 parts by weight of n-butyl acrylate, 30 to 60 parts by weight of acrylonitrile, and from 1 to 10% of methacrylic acid.

11. A coated abrasive sheet wherein abrasive grains are firmly bonded to a flexible backing by an animal glue make adhesive, said backing comprising a fibrous sheet saturated with and unified by a copolymer of monomers consisting essentially of 30 to 70 parts by weight of acrylic ester, 30 to 60 parts by weight of acrylonitrile, and 5 to 10 parts of homopolymerizable alpha, beta unsaturated olefinic monocarboxylic acid having a methylene group attached to the alpha carbon atom, said acrylic ester being polymerizable per se to a product having a glass transition temperature below 40° C.

12. Coated abrasive sheet material comprising in combination a layer of abrasive granules firmly bonded to a backing by a hardened binder adhesive, said backing comprising a fibrous sheet treated with a unifying flexible film-forming copolymer of monomers consisting essentially of 30 to 80 parts by weight of acrylonitrile, from 0 to 15% by weight of polymerizable alpha, beta-unsaturated acid having a methylene group attached to the alpha carbon atom, and 20 to 70 parts by weight of at least one acrylic ester formed by reacting an acrylic acid selected from the class of acrylic acid and methacrylic acid with an alcohol having up to about 8 carbon atoms, the esters in said copolymer being selected such that if polymerized per se the result polymer will have a glass transition temperature lower than 40° C.

13. The product of claim 12 wherein said one acrylic ester is n-butyl acrylate.

14. The product of claim 13; wherein the copolymer contains, on a weight basis, 35–70 parts of acrylonitrile and 30–65 parts of n-butyl acrylate.

15. The product of claim 13, wherein said alpha, beta-unsaturated acid is methacrylic acid, said copolymer containing about 3% thereof by weight.

References Cited

UNITED STATES PATENTS

| | | | |
|---|---|---|---|
| 2,327,218 | 8/1943 | Robie | 51—298.1 |
| 3,011,882 | 12/1961 | Quinan | 51—298 |
| 3,231,533 | 1/1966 | Garrett et al. | 260—29.6 |
| 3,238,159 | 3/1966 | Di Benedetti et al. | 260—29.6 |
| 2,753,318 | 7/1956 | Maeder | 260—29.6 |
| 2,866,763 | 12/1958 | Sanders | 260—29.6 |

DONALD J. ARNOLD, Primary Examiner

U.S. Cl. X.R.

51—298, 298.1, 300, 301

UNITED STATES PATENT OFFICE
CERTIFICATE OF CORRECTION

Patent No. 3,505,045          Dated  April 7, 1970

Inventor(s)  William A. Klein

It is certified that error appears in the above-identified patent and that said Letters Patent are hereby corrected as shown below:

Column 2, line 27, insert -- temperature -- after "transition". Column 3, line 24, "them" should be -- the -- and "anufacture" should be -- manufacture --; line 58, "60.65°C." should be -- 60-65°C. --. Column 4, line 30, "to" should be -- of --; line 47, "adhension" should be -- adhesion --. Column 6, line 17, "fixed" should be -- flexed --; line 43, "production" should be -- product --. In the Table under copolymer I in column headed "comments", delete the period (".") after "affin." and insert a hyphen (-- - --).

SIGNED AND SEALED
SEP 8 - 1970

(SEAL)
Attest:

Edward M. Fletcher, Jr.
Attesting Officer

WILLIAM E. SCHUYLER, JR.
Commissioner of Patents